United States Patent [19]

Akai

[11] Patent Number: 5,228,800
[45] Date of Patent: Jul. 20, 1993

[54] PURIFYING BREAKWATER

[76] Inventor: Kazuaki Akai, 20/Ogura, Wakayama, 640-62, Japan

[21] Appl. No.: 327,818

[22] Filed: Mar. 23, 1989

Related U.S. Application Data

[63] Continuation of Ser. No. 52,163, May 20, 1987, abandoned, which is a continuation of Ser. No. 527,514, May 4, 1984, abandoned.

[30] Foreign Application Priority Data

Mar. 29, 1983 [JP] Japan .................................. 58-00099

[51] Int. Cl.[5] .............................................. E02B 3/06
[52] U.S. Cl. ........................................ 405/21; 405/25; 405/30
[58] Field of Search ..................................... 405/28-34

[56] References Cited

U.S. PATENT DOCUMENTS

| 3,096,621 | 7/1963 | Danel | 405/30 X |
| 3,118,282 | 1/1964 | Jarlan | 405/31 |
| 3,538,710 | 11/1970 | Tourmen | 405/31 |
| 3,548,600 | 12/1970 | Stolk et al. | 405/30 |

Primary Examiner—Dennis L. Taylor
Attorney, Agent, or Firm—Ronald P. Kananen

[57] ABSTRACT

A structure utilizing wave energy to purify water. The structure includes a base placed on the sea bed of a body of a breakwater placed on the base along its front edge, and a bank placed on the base along its rear edge to form a surf zone between the bank and the breaker works. The breakwater has a height relative to the base for breaking the incoming waves, and the bank has a height relative to the base sufficient to stop the advance of the broken waves.

15 Claims, 1 Drawing Sheet

PURIFYING BREAKWATER

This is a continuation of Ser. No. 07/052,163, filed on May 20, 1987, now abandoned, which is a continuation of Ser. No. 06/527,514, filed May 4, 1984, now abandoned.

BACKGROUND OF THE INVENTION

This invention relates to structures placed in water which utilize the wave energy of the water to purify it.

The degree to which sea or lake water has been polluted with sewage and other pollutant sources has been increasing over the years, and this is a serious problem especially for aquatic products. Therefore, there has been an increasing need for an inexpensive and safe means for purifying sea and lake water.

SUMMARY OF THE INVENTION

There is provided in accordance with the present invention a structure for purifying water by utilizing wave energy. The structure comprises a base placed in the water on the sea or lake bed, the base being made of a porous material. Breaker works or breakwaters are placed on the base along the front edge of the base. The breaker works have a height with respect to the base designed for breaking the incoming waves. A bank is placed on the base along the rear edge of the base in spaced relation to the breaker works to form a surf zone therebetween. The bank has a height relative to the base for stopping the advance of the broken waves.

In another aspect of the present invention, there is also provided a structure for purifying water by utilizing wave energy. This structure comprises a base placed in the water, the base being made of a porous material. Breaker works or breakwaters are similarly placed on the base along the front edge of the base to form a surf zone behind it. The breaker works have a height with respect to the base for breaking the incoming waves. The base has a rear edge directed to a source of water flow to permit water to flow from the water flow source into the surf zone.

BRIEF DESCRIPTION OF THE DRAWINGS

This invention will be described in greater detail by reference to the following description taken in connection with the accompanying drawings, in which like reference numerals refer to the same or corresponding parts, and wherein.

DETAILED DESCRIPTION OF THE PREFERRED EMBODIMENTS

Figure 1:
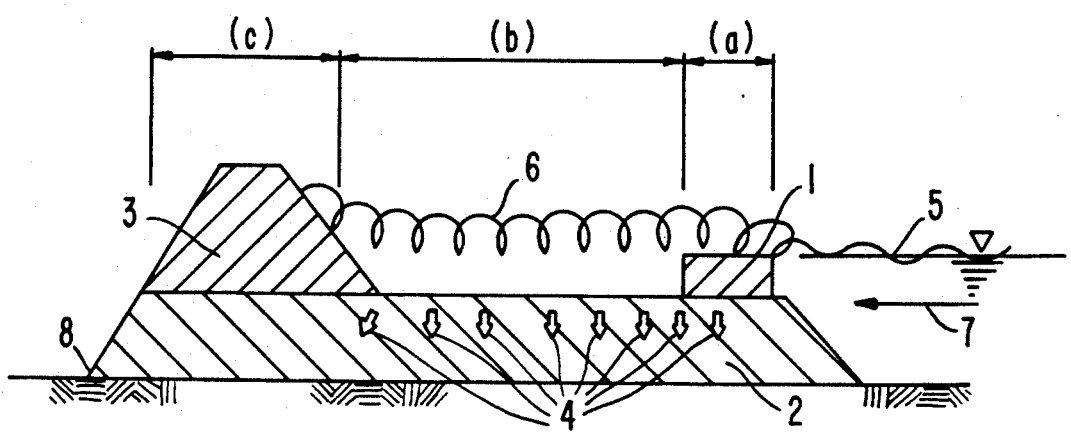
FIG. 1 is a sectional view showing one embodiment of a water purifying structure made in accordance with the present invention.

With reference to the drawings and in particular to FIG. 1, there is shown a water purifying structure embodying the present invention. The structure has a base 2 installed on a sea or lake bottom 8. The base 2 is made of a porous material and it carries thereon breaker works or breakwater 1 which is placed along the front edge thereof. The breaker works 1 have a height with respect to the base for breaking the incoming waves. Preferably, the breaker works are made of a porous material more coarse than the material of the base 2. A bank 3 is placed on the base 1 along the rear edge of the base to form a channel or a surf zone (b) between the bank 3 and the breaker works 1. The surf zone is shown as having a level surface of a substantial width. The bank 3 has a height with respect to the base for cutting off the broken waves or stopping their advance. The bank 3 may also be made of a porous material.

The breaker works 1 break the incoming waves 5 in a direction indicated by arrow 7 to mix air into the water passing over the breaker works. This air mixing effect increases the amount of oxygen dissolved in the water which permeates into the base 2 through its pores, as indicated by the solid arrows, thereby promoting the activation of fishes, shellfishes, algae, and other aquatic vegetations living in the pores who eat or absorb the planktons and other contaminants in the permeated water and also accelerating the catalytic oxidation of the permeated water. This is also effective to accelerate flocculation of the pollutants in the permeated water. The air mixing effect is promoted by the broken waves colliding with and reflecting on the bank 3 to agitate the water in the surf zone. This cycle is repeated at the mercy of the waves. The water, which has permeated through the breakwater, is purified. In addition, the breakwater extinguishes wave energy to maintain the water area behind it calm, thereby facilitating sedimentation of pollutants and impurities.

Thus, it is apparent that the present invention utilizes wave energy to purify sea or lake water at a relatively low cost. In addition, the breakwater decreases the wave energy and thus is useful for protection of coastal areas and for the safety of the waterways.

Figure 2:
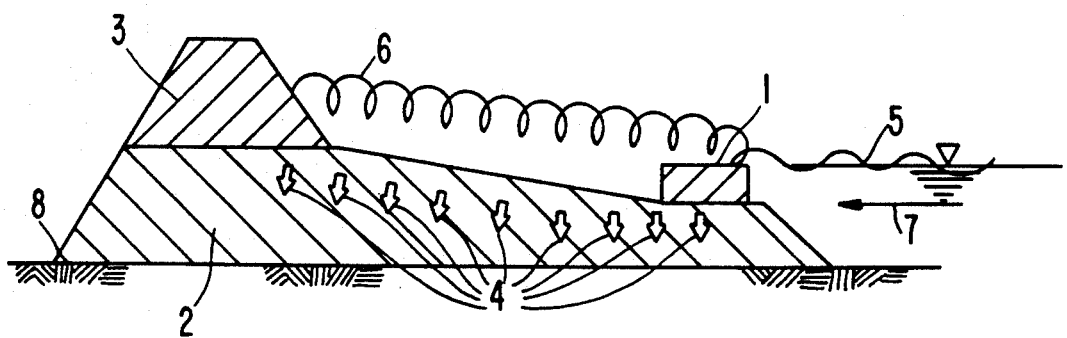
FIG. 2 is a sectional view showing a modified form of a water purifying structure of the present invention.

Referring to FIG. 2, there is illustrated a modified form of the breakwater where the surf zone (b) has a sloped surface inclined downward toward the breaker works 1. This modification promotes the water agitating effect and thereby increases the amount of oxygen dissolved in the water in the surf zone.

Figure 3:
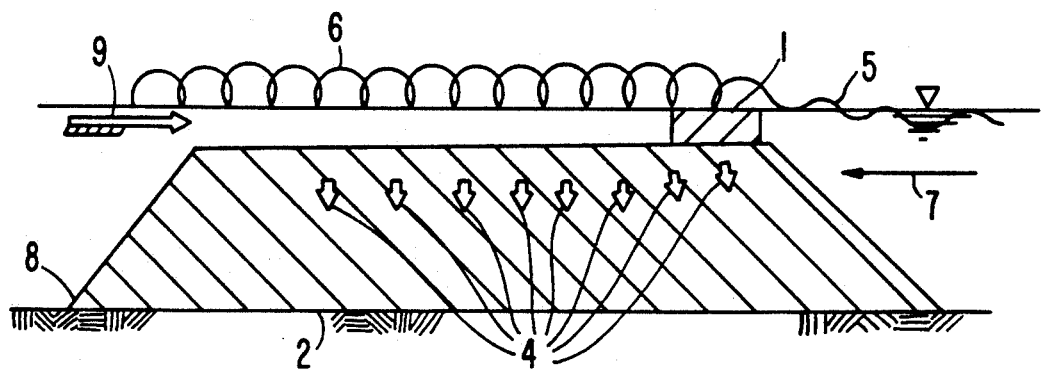
FIG. 3 is a sectional view of a second embodiment of a water purifying structure of the present invention.

Referring to FIG. 3, there is illustrated an alternative embodiment of the water purifying structure of the present invention. This embodiment is substantially the same as the first embodiment of FIG. 1 except that the bank 3 is omitted. The rear edge of the base 2 is disposed in a direction opposite to the direction of flow of water, indicated by arrow 9, introduced from a source of water flow, such for example as the mouth of a river. The water flows from the source into the flow of the broken waves 6 to agitate the water in the surf zone (b) so as to increase the amount of oxygen dissolved in the water.

Although this invention has been described in connection with a water purifying structure placed in a sea or lake for purifying the water, it is to be understood that it can be used in a variety of situations where water purification is required. For example, the present invention is applicable in bathing places, fish farms, high-level waste water disposal plants, and the like.

While preferred embodiments of the present invention have been shown and described, various other embodiments and modifications thereof will be apparent to those skilled in the art, and will fall within the scope of this invention as defined in the following claims.

The scope of claim for this patent is as followed:
1. A structure for purifying water comprising:
a submerged base positioned in a body of water, said base having a front portion generally facing the direction of incoming waves of the body of water and a rear portion spaced from said front portion, a breakwater formed of porous material and supported on said front portion of said base and having a height sufficient to break the incoming waves flowing towards said base, so as to permit aerated water to ride over the breakwater, a surf zone for defining a habitat for pollutant consuming marine life, defined on a submerged portion of said submerged base behind said breakwater so as to be subjected to the aerated water of said waves breaking over said breakwater, means including a bank formed of porous material and supported on said rear portion of said base, sloping generally towards said breakwater and spaced therefrom, to define said surf zone therebetween, and having a sufficient height to stop the advance of the broken waves flowing from said breakwater for permitting the agitation of the aerated water to increase the percentage of oxygen dissolved in the aerated water, and said base including a central portion disposed in said surf zone and having an upper surface through which the aerated water penetrates into the base and is purified under contact oxidation in the presence of aerobes living in the body.

2. The structure of claim 1 including,
said breakwater being configured relative to the incoming waves to absorb the energy of the waves impacting it.

3. The structure of claim 1 including,
said breakwater being configured to break the incoming waves and thereby increase the amount of oxygen dissolved in the water passing over said breakwater to said surf zone.

4. The structure of claim 1 including,
said upper surface sloping from said bank towards said breakwater.

5. The structure of claim 1 including,
said upper surface being horizontally disposed between said breakwater and said bank.

6. The structure of claim 1 including,
said breakwater being formed of a material that is more coarse than the material of said base.

7. The structure of claim 1 including,
said bank being formed of a porous material.

8. The structure of claim 1 including,
said porous material of said base having pores configured and adapted to provide homes for aquatic living matter which feeds on or absorbs contaminants in the water of said surf zone.

9. The structure of claim 1 including,
said front portion including a front edge, and said breakwater being placed along said front edge.

10. The structure of claim 1 including,
said body of water being a sea.

11. The structure of claim 1 including,
said body of water being a lake.

12. The structure of claim 1 including,
said bank being sloped towards said surf zone at a steeper angle than said base in said surf zone slopes towards said breakwater.

13. A structure for purifying water comprising:
a submerged base positioned in a body of water,
said base having a front portion generally facing the direction of incoming waves of the body of water and a rear portion spaced from said portion, a breakwater supported on said front portion of said base and having a height sufficient to break the incoming waves flowing towards said base, so as to permit aerated water to ride over the breakwater, a surf zone defining a habitat for pollutant consuming marine life, defined on a submerged portion of said submerged base behind said breakwater so as to be subjected to the aerated water of said waves breaking over said breakwater, said breakwater being the highest portion of said structure and said base being positioned so that said rear portion is exposed to a source of water flow to permit water to flow from said source of water flow into said surf zone to agitate the aerated water in said surf zone to increase the percentage of oxygen dissolved in the aerated water, said base having an upper surface in the vicinity of which aerated water is purified under contact oxidation in the presence of aerobes.

14. The structure of claim 13 including, said source of water being the mouth of a river.

15. A structure for purifying water comprising:
a submerged base positioned in a body of water,
said base having a front portion generally facing the incoming waves of the body of water and a rear portion spaced from said front portion, a breakwater supported on said front portion of said base and having a height sufficient to break the incoming waves flowing towards said base, so as to permit water to ride over the breakwater, means including a bank supported on said rear portion of said base, sloping generally towards said breakwater and spaced therefrom, to define a submerged surf zone therebetween, and having a sufficient height to stop the advance of the broken waves flowing from said breakwater for permitting agitation of the water in the surf zone to increase the percentage of oxygen dissolved in the water, said base including a central portion disposed in said surf zone and having an upper surface through which the aerated water penetrates into the base and is purified under contact oxidation in the presence of aerobes living in the body of water, and
means for aerating the water.

* * * * *